United States Patent
Dougall et al.

(10) Patent No.: US 6,389,042 B1
(45) Date of Patent: May 14, 2002

(54) DATA PROMPT AND COLLECT IN TELECOMMUNICATIONS NETWORK HAVING DIGITAL DATA AND BEARER CHANNELS ON SINGLE COMMUNICATIONS LINE

(75) Inventors: Steven Singh Dougall; Michael Gordon Foxton, both of Ipswich; Jonathan Hopkins, Saxmundham, all of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/051,029
(22) PCT Filed: Jun. 24, 1997
(86) PCT No.: PCT/GB97/01711
§ 371 Date: Apr. 2, 1998
§ 102(e) Date: Apr. 2, 1998
(87) PCT Pub. No.: WO98/01005
PCT Pub. Date: Jan. 8, 1998

(30) Foreign Application Priority Data

Jun. 28, 1996 (EP) .............................................. 96304771

(51) Int. Cl.[7] .................................................. H04J 3/12
(52) U.S. Cl. .................................... 370/524; 379/93.01
(58) Field of Search ................................ 370/357, 522, 370/524; 379/93.01, 93.02, 93.03, 93.04

(56) References Cited

U.S. PATENT DOCUMENTS

| | | | |
|---|---|---|---|
| 5,043,983 A | * 8/1991 | Dorst et al. | 370/384 |
| 5,193,110 A | * 3/1993 | Jones et al. | 370/93.14 |
| 5,375,124 A | * 12/1994 | D'Ambrogio et al. | 370/420 |
| 5,490,251 A | * 2/1996 | Clark et al. | 709/237 |
| 5,509,062 A | 4/1996 | Carlsen | |
| 5,550,834 A | * 8/1996 | D'Ambrogio et al. | 370/385 |
| 5,550,907 A | 8/1996 | Carlsen | |
| 5,550,911 A | * 8/1996 | Bhagat et al. | 379/220 |
| 5,761,294 A | 6/1998 | Shaffer et al. | |
| 5,912,887 A | 6/1999 | Schgal | |
| 5,991,389 A | * 11/1999 | Ram et al. | 379/230 |

FOREIGN PATENT DOCUMENTS

| | | |
|---|---|---|
| EP | 480 634 | 4/1992 |
| FR | 2 671 251 | 7/1992 |

OTHER PUBLICATIONS

Tao et al, "Internet Access Via Baseband and Broadband ISDN Gateways", Proceedings of the Annual International Phoenix Conference on Computers and Communicatons, Phoenix, Apr. 12–15, 1994, No. Conf. 13, Apr. 12, 1994, Institute of Electrical and Electrical Engineers, pp. 485–490.

Betts et al, "ISDN and Intelligent Network Based Telepoint Service", Electrical Communication, vol. 64, No. 1, Jul. 1, 1990, pp. 85–94.

Patent Abstracts of Japan, vol. 014, No. 133 (E–0902), Mar. 13, 1990 & JP 021670 A (Fujitsu LTD) Jan. 5, 1990.

* cited by examiner

*Primary Examiner*—Min Jung
(74) *Attorney, Agent, or Firm*—Nixon & Vanderhye PC

(57) ABSTRACT

To obtain further instruction form connected ISDN terminals a service resource function is provided. The function is responsive to data carried in ISDN data channels to provide prompt and collect service to users of ISDN. This allows the addition of prompt and collect services such as account allocation to be provided.

6 Claims, 5 Drawing Sheets

US 6,389,042 B1

DATA PROMPT AND COLLECT IN TELECOMMUNICATIONS NETWORK HAVING DIGITAL DATA AND BEARER CHANNELS ON SINGLE COMMUNICATIONS LINE

RELATED APPLICATION

This application is related to our commonly assigned co-pending application Ser. No. 09/029,593 filed Mar. 5, 1998.

BACKGROUND OF THE INVENTION

1. Field of the Invention

The present invention relates to telecommunications networks and more particularly to telecommunications networks of the kind requiring communications between the network and terminals attached thereto without provision of a voice communications path at the initial phase of a communications call.

2. Related Art

Many services provided by telecommunications networks will require information additional to a telephone number for example to enable completion of a connection through the transport network. For example, credit or charge card calls may require entry of a personal identification number (PIN) and/or an account number prior to proceeding. Where such services are provided after the customer has been connected through the network to a peripheral a voice or other prompt may be used to request the customer to enter further detail. Such services are therefore often referred to as "prompt and collect" services.

Where a customer has a telephone instrument or other terminal adapted to signal the network by use of multi-frequency tones, it is possible for the prompt and collect service to operate by the coding of the tones without establishing a complete speech path through the network. However, many communications connections are not by way of analogue lines to the customer's premises but are rather of a digital type and, more particularly, of a type known as ISDN in which a single customer connection carries multiple 64 Kbs digital bearer channels and a data channel.

ISDN terminals do not function efficiently in the provision of multi-frequency tones until the terminal is put into a speech phase. However, putting the call into the speech phase prior to effecting a connection simply to enable prompt and collect services to operate may result in charging difficulties as the customer equipment may see a network response as a valid answer.

Further, if the ISDN call originates from a data terminal, ISDN standards do not permit switching back to a data phase after switching into voice phase communication. In many cases also data terminals may not include multi-frequency transmission capability and/or may not include speaker or headset facilities to receive voice prompts.

SUMMARY OF THE INVENTION

According to the present invention there is provided a telecommunications network comprising a number of interconnected switching units at least some of which provide switching for ISDN connections, some of said switches being connected to terminals adapted to provide voice channel and data channel communications and to provide switching instructions by way of a data channel connection, control means of the network being responsive to seizure of a switch connection to recognise presence of such a terminal and to cause control means of the switch to effect decoding of data from a data channel associated with the terminal to collect any further control information required by the network.

Preferably, the control means of the network causes the control means of the switch to effect transfer of data channel signalling from a connected ISDN termination through switch means to a prompt-and-collect peripheral adapted to extract control information from transmitted data.

The Prompt-and-collect peripheral may be arranged to transmit data through the switch means for transmission as a data message to a connected ISDN termination to cause display of a prompt message or to cause automated transmission by any terminal connected thereto of data defining required control information.

In one arrangement the prompt-and-collect peripheral is responsive to the control means of the switch to collect data, the control means of the switch effecting transmission of collected data to the control means of the network.

In an alternative arrangement the control means of the switch causes received data to be transmitted to the prompt-and-collect peripheral, the peripheral affecting transmission of collected data to the control means of the network.

According to a feature of the invention there is provided a method of providing prompt and collect services in a digital telecommunications network of the kind in which a received bit stream comprises a plurality of bearer channels and a data channel, the method comprising in respect of each bearer channel initiated call determining from the data channel a network destination; determining from network data relating either to the call source or the network destination whether further data is required from the call source and, if so, causing a data message to be,returned to the call source in the data channel to provide prompt information to a user; and awaiting user information returned in the data channel prior to completing connection of the bearer channel call to the network destination.

BRIEF DESCRIPTION OF THE DRAWINGS

A telecommunications network in accordance with the invention will now be described by way of example only with reference to the accompanying diagrams of which.

DETAILED DESCRIPTION OF EXEMPLARY EMBODIMENTS

Figure 1:
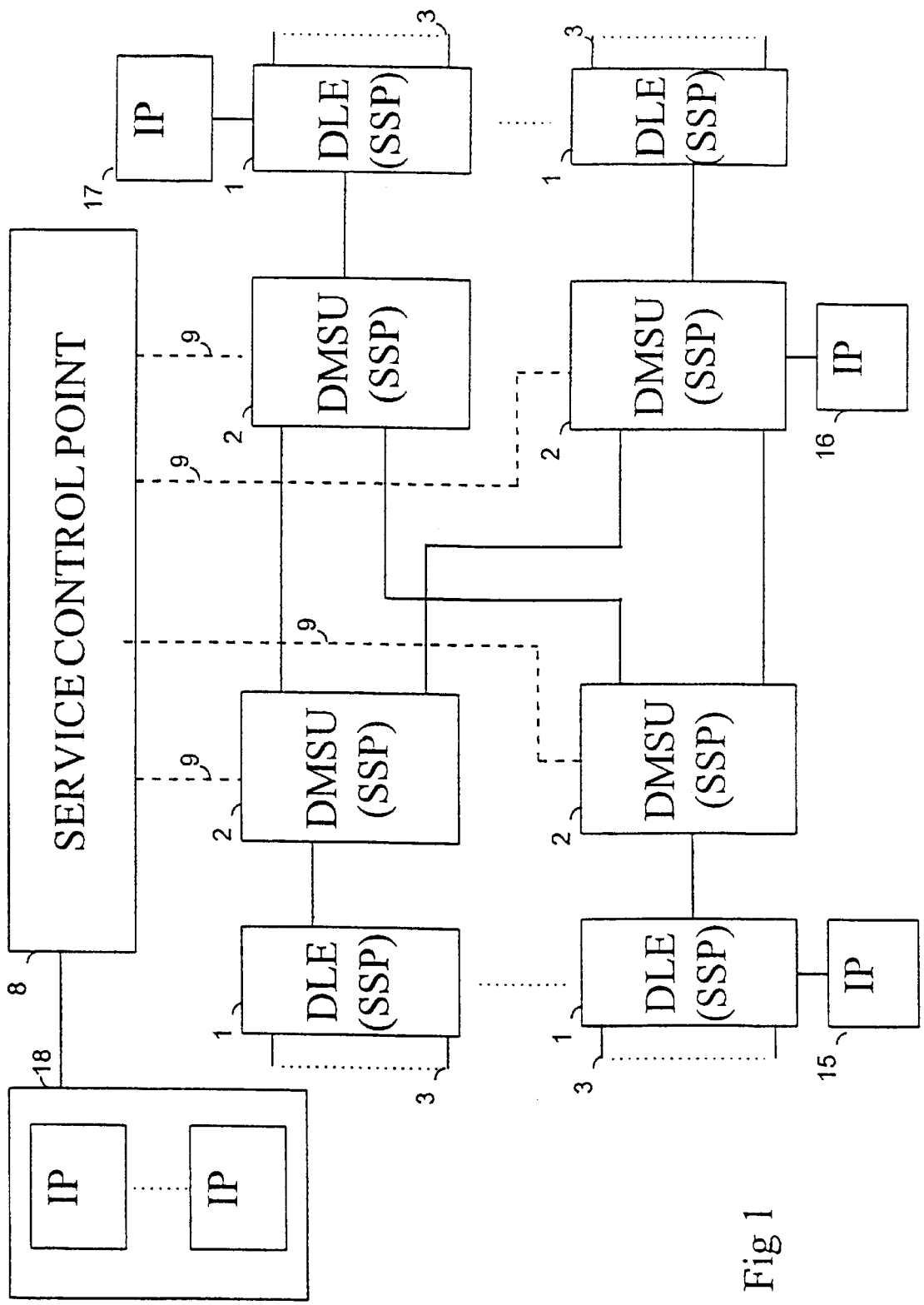
FIG. 1 shows a telecommunications network of the kind sometimes called an intelligent network.

Referring first to FIG. 1 there is shown a typical modern digital public switched telecommunications network (PSTN) including interconnected digital main switching units (DMSU) 2 and digital local exchanges (DLE) 1 having connections 3 to customer premises. This typical network allows communication between any of the customer lines 3 and any other customer line 3 by effecting switching through the digital local exchanges and digital main switching units in response to information signalled by the customer.

While basic telephony, that is where a direct relationship exists between the information signalled and the connection effected, is easily provided by such a system where significant number translation facilities are required or complex additional services such as allocating costings across a number of accounts may be needed, additional intelligence is required. Such additional intelligence may be provided by a single network point or several network points having substantial intelligence and in the network shown a single service control point 8 has been provided. If a local service switching point, either a digital local exchange 1 or DMSU 2 detects a requirement for additional instruction using C7 signalling on virtual paths 9, for example, and transmitting relevant information to the service control point 8, instruction on further handling of the call within the core transport network may be provided.

Such instruction may require the connection of a calling customer to an intelligent peripheral 15, 16, 17, 18 by way of the network to effect functions such as prompt and collect.

Figure 2:
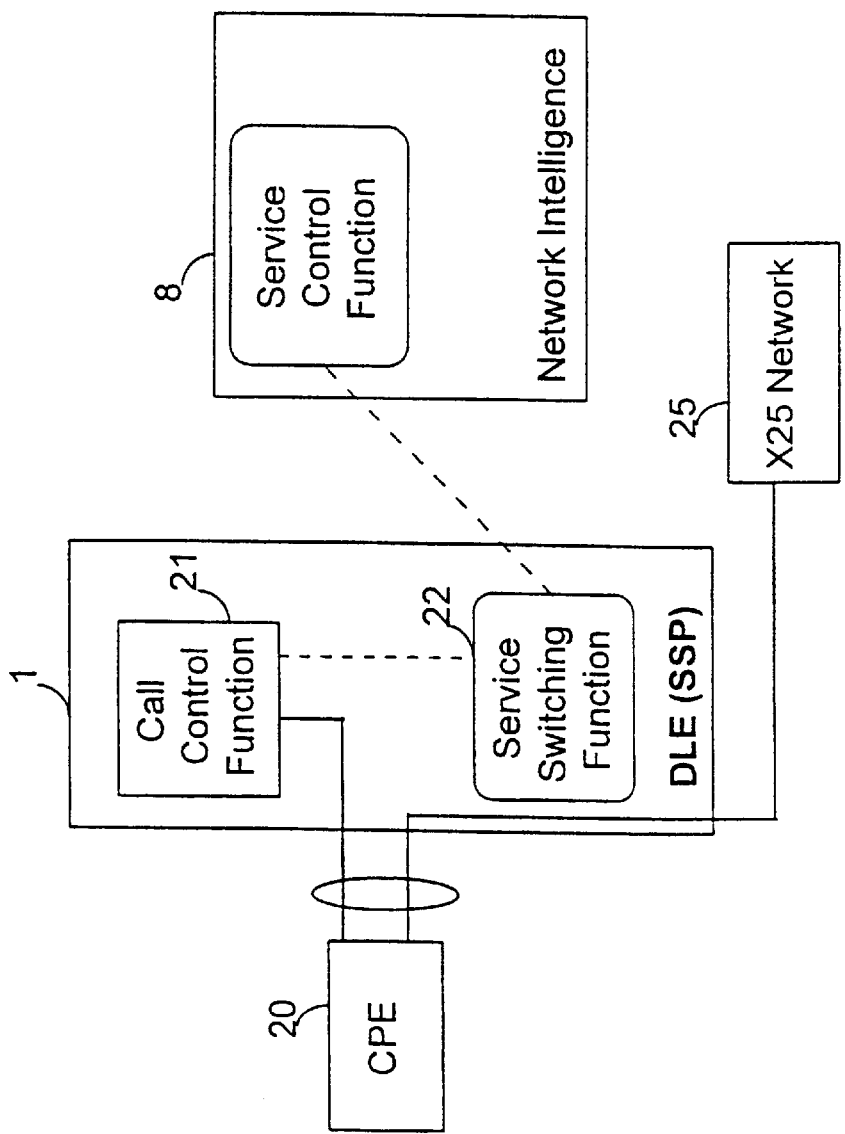
FIG. 2 shows a detail of one of the digital local exchanges in the telecommunications network of FIG. 1.
Figure 3:
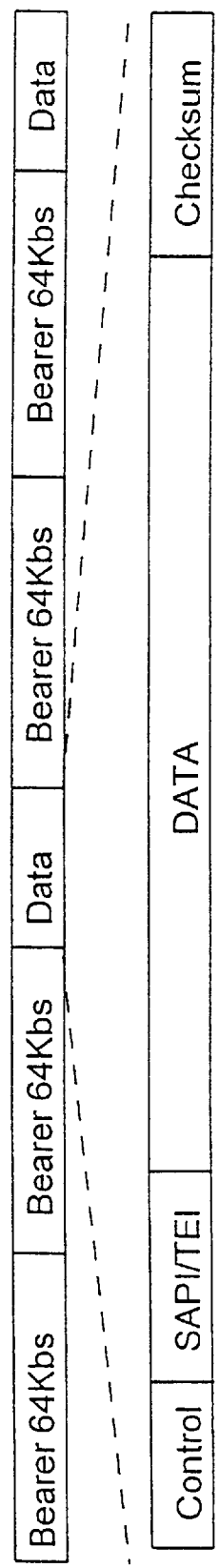
FIG. 3 shows schematically data transmission between customer premises equipment and the exchange of FIG. 2.

Turning now to FIG. 2 and FIG. 3, ISDN terminals at customer premises (CPE) 20 transmits a digital bit stream of intermixed bearer channels and data channels which on entry to the digital local exchange 1 are routed accordingly (this function not shown separately) and each data message in the data channel is examined to determine its function.

Referring specifically to FIG. 3, the function of any particular data message is determined by a service access port identifier (SAPI) which is one of 256 channels identifying the appropriate destination for the data which follows. Specifically an SAPI of 0 identifies a message for call control function 21 of DLE 1 and for example SAPI 16 identifies that the message is to be transferred via an X25 data network schematically represented at 25. For completeness it is here noted that a terminal endpoint identifier (TEI) identifies one of 256 potential destinations. One example of this is that in X25 messages identified by an SAPI of 16 the TEI identifies a service provider. Some other SAPIs are allocated to specific functions by international agreement on ISDN services and some are reserved for future network expansion.

The two bearer channels arriving at the DLE 1 from the customer premises equipment 20, which may be for example a fax machine, telephone or computer ISDN card originated, are switched through the network in accordance with set up data provided to the exchange call control via a SAPI 0 data message.

For example where a voice call is using one of the 64 Kbs bearer channels, the SAPI data message may contain a called number to which calls are to be directed. If additional functionality based either on the source of the call or destination of the call is indicated then the call control function 21 will normally cause the service switching function 22 of the DLE 1 to request instruction from the service control function (SCF) 8.

Referring again to FIG. 1, for analogue calls if the service control point 8 identifies the need for prompt and collect functions it would normally cause the service switching function to connect an appropriate intelligent peripheral which forwards a voice prompt, collects customer responses and forwards the additional data. Once the additional data has been forwarded to the service control function 8 it may instruct the service switching function 22 to respond to that data in a particular manner, thus effecting completion of connection through the core transport network or connecting a customer to further intelligent peripherals 15–18.

Figure 4:
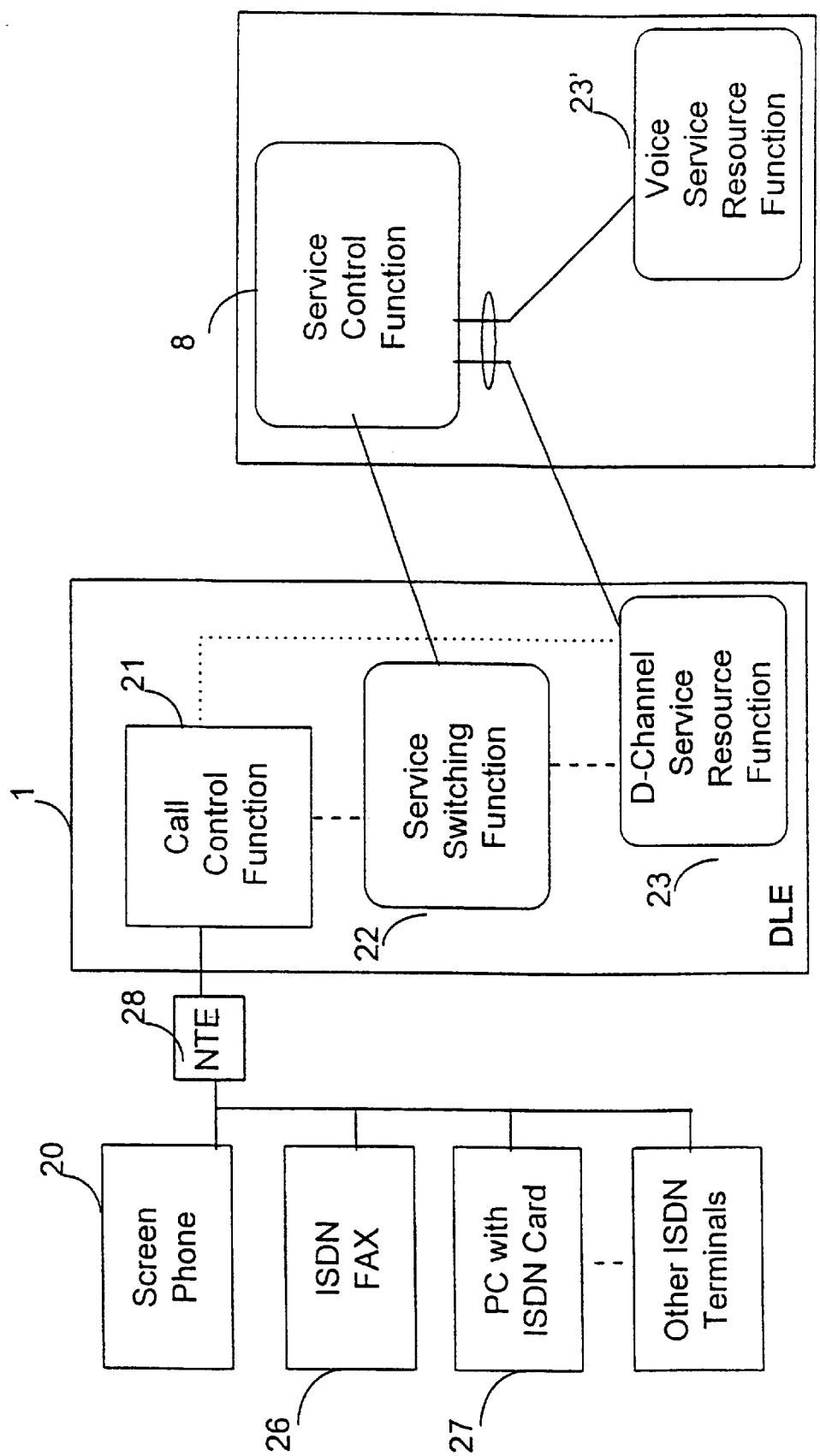
FIG. 4 shows a modification of the network of FIG. 2.

In the present invention, where the origin of a call is an ISDN digital connection the DLE 1 includes additional functionality as shown in FIG. 4 to which reference is now made. In the DLE 1, an additional service resource function is provided which enables ISDN messages to be transmitted to customer premises equipment and received therefrom in the D channel. Now, if the service control function 8 identifies from a C7 message received from the service switching function using the intelligent network applications part (INAP) the D channel specialised resource function (SRF) 23 having an interface to the service switching function 22 and call control function 21 of the DLE 1 is used. Thus, if the CPE 20 of FIG. 2 is a screenphone 24, for example, then once the appropriate destination identity has been derived from the SAPI 0 data message by the call control function 21 and reference of the service switching function 22 to the SCF 8 has occurred, if the SCF 8 identifies the need for prompt and collect information it will forward a C7 message using INAP to the SRF 23 which allows the SRF 23 to cause a D channel message to be returned to the screenphone 24 in a generic text. Thus a prompt message will appear on the display of the screenphone 24. The SRF 23 is now responsible for monitoring further data received in the SAPI 0 data message when the customer enters additional required information.

Having received the additional information the SRF 23 causes a C7 INAP message to be transmitted to the SCF 8 which may either require further prompt and collect activity by the SRF 23 or will cause the service switching function 22 and call control function 21 of the DLE 1 to complete switching of the bearer channel call through the network. For the avoidance of doubt it is here noted that a SAPI other than 0 could be used and routed by the exchange function for the purposes of responsive data transmission.

It will also be appreciated that certain terminals, for example the PC 27, may be arranged to transmit an automated response to a prompt message.

Once characters are returned from the key pad or automatically the SCF 8 may arrange appropriate instructions to be forwarded to the service switching function 22 to enable completion of the call through the transport network.

As will be appreciated the SRF 23 may forward data messages to computer terminals (for example 27), fax machine 26 and the like for prompt and collect purposes in the same manner as described for use with a screenphone. Accordingly all of the functions normally provided to analogue telephones and terminals using voice prompt and collect functions can be provided to ISDN terminals, for example, in an account situation where specified calls are to be allocated to particular account codes.

As will be appreciated appropriate protocols whether ISDN or C7 or intelligent network application protocols are used on the varying links between customer premises equipment, the DLE and the SCF. For the avoidance of doubt it is here noted that the voice service resource function 23 shown in the network intelligence area may be co-located in an appropriate digital local exchange and/or function in known manner for voice service prompt and collect.

Figure 5:
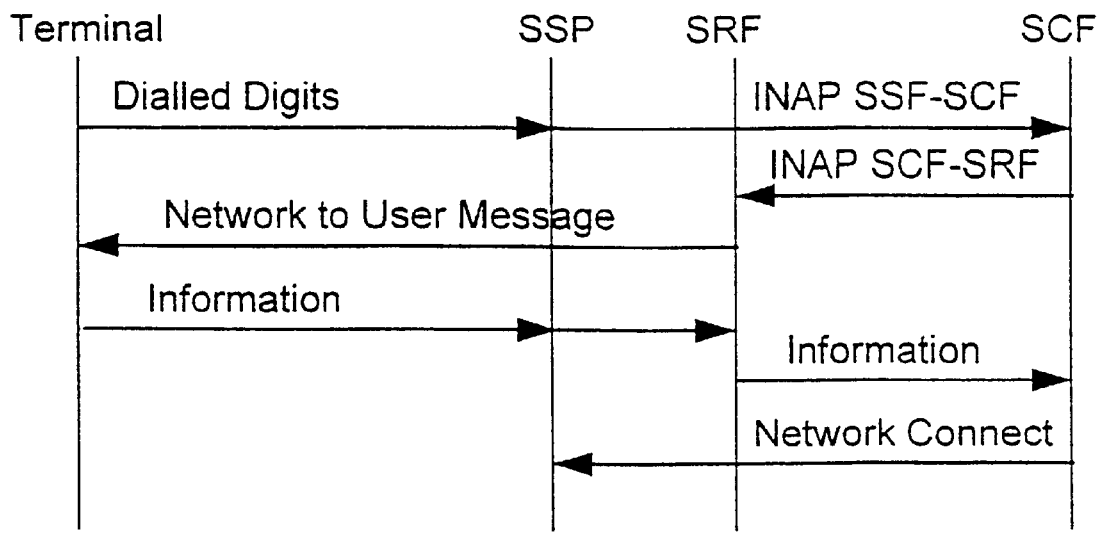
FIG. 5 shows schematically data signalling interchanges in the network of FIG. 4.

Note that in FIG. 4, network termination equipment (NTE) 28 in the customer's premises are provided to enable connection of the various terminals. Any of the terminals may selectively use either or both of the bearer channels and/or the data channel as appropriate. FIG. 5, to which reference is now also made, shows schematically the interchange of data between the terminal and the network components. Thus, when a terminal seizes one of the bearers channels through the NTE 28, digits dialled by the terminal are assembled into a data message and transmitted to the network. The service switching point (SSP) of the DLE 1, on receipt of the message, attempts to establish a call triggering within the network will identify the need for further service control information. This results in an INAP message being forwarded by the service switching function to the SCF 8. Using the identity of the calling connection, for example, and the data dialled the SCF having determined that additional information is required forwards an INAP message to the SRF which causes a D channel message to be transmitted back to the calling terminal. Once the calling terminal has returned the appropriate information, again by way of a D channel message through the call control function to the SRF 23, the information is passed back to the SCF again in the form of an INAP message. The SCF, having obtained all necessary information and storing any data necessary for example for billing purposes, will cause the service switching function to progress the call as appropriate.

Note that for completeness a voice SRF is shown in the SCF area of FIG. 4. This is an alternative intelligent peripheral for use with analogue connections through the network for prompt and collect purposes and is used in previously known manner.

Figure 6:
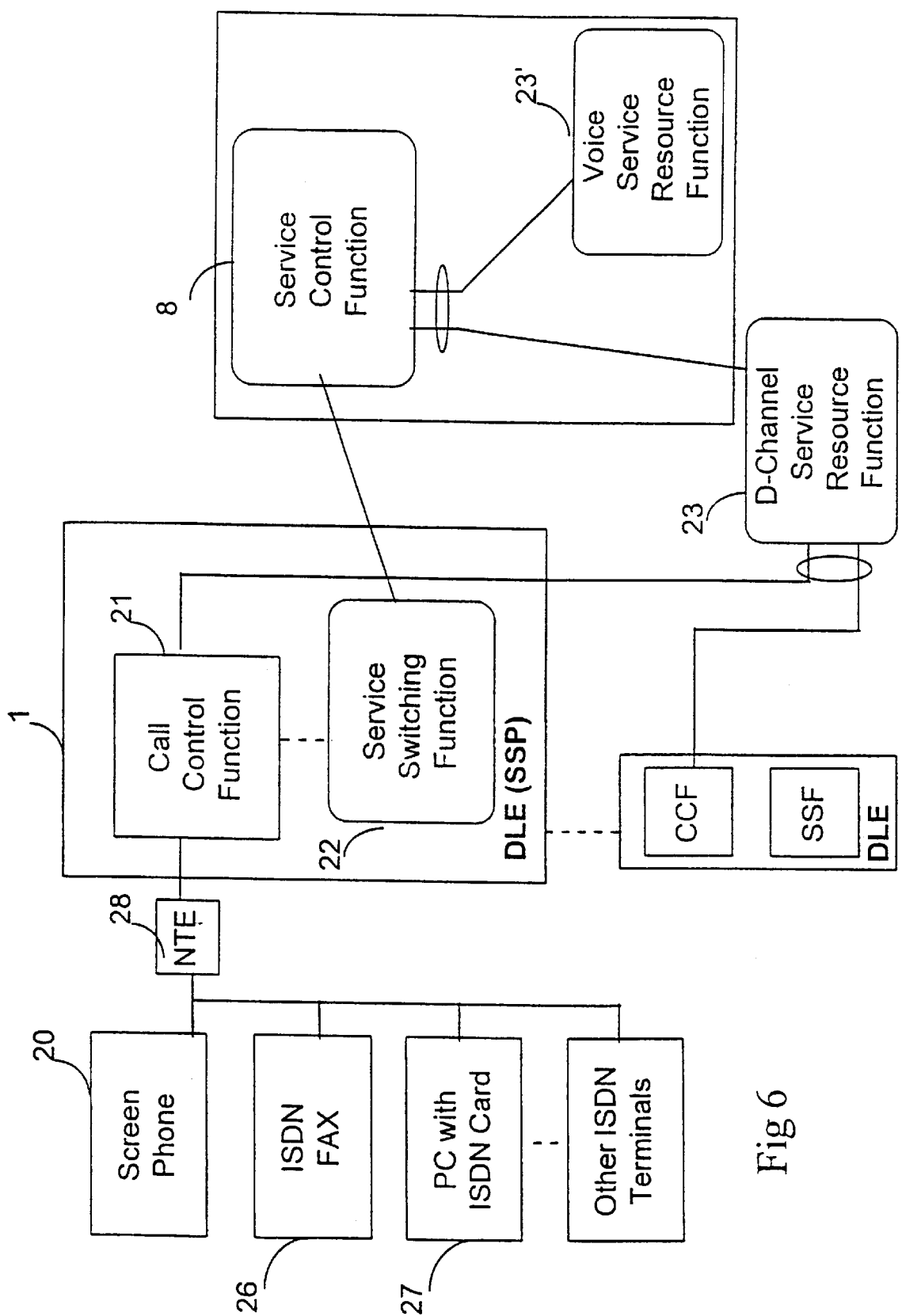
FIG. 6 shows an alternative adaptation of the network of FIG. 2.

In an alternative arrangement of the network, as shown in FIG. 6, the data SRF 23 is located elsewhere in the network than in association with specific DLE 1. Using a more centralised SRF, as shown here, allows several DLEs 1 to access the same intelligent peripheral for purposes of data prompt and collect. In this case, when the call control function 21 of a digital local exchange determines that a call requires additional handling, once the SCF has identified that a digital prompt and collect is required, the signalling path between the call control function 21 of the DLE 1 and the SRF 23 is used.

Figure 7:
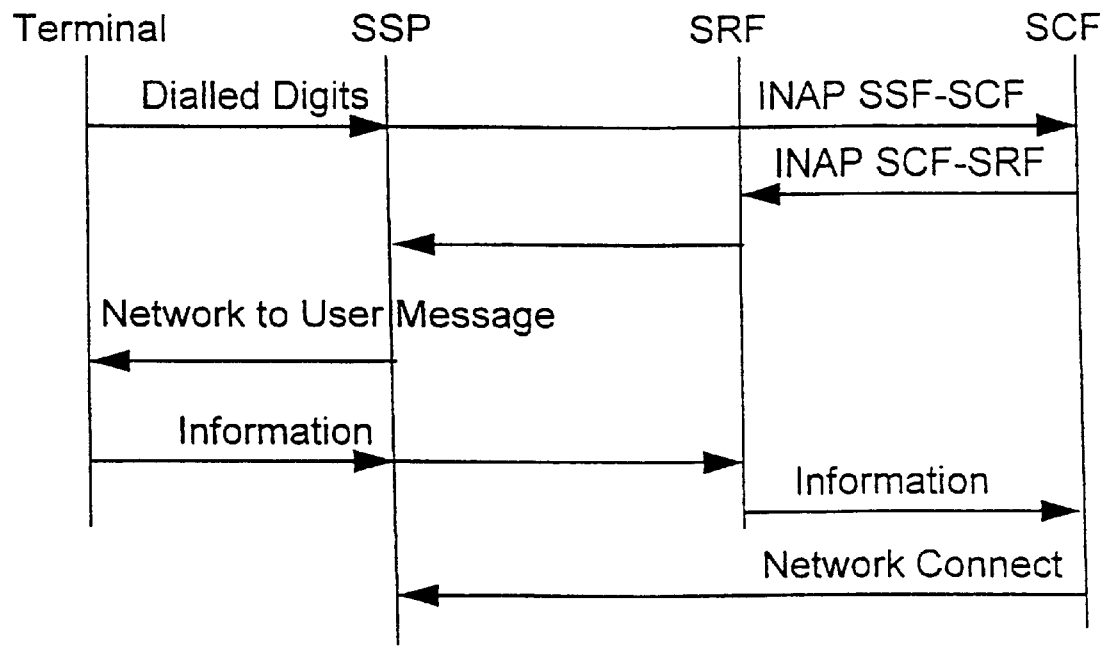
FIG. 7 shows schematically data signalling interchanges in the network of FIG. 6.

Referring additionally to FIG. 7, message transfer differs from that of FIG. 5, only insofar as a differing protocol may be required between the call control function 21 and the SRF 23. Primarily, the call control function requires to be used to effect additional transfer of network to user messages and progress user to network messages.

Data channel signals returned from the network will include a terminal endpoint identifier which determines the destination apparatus for the following data message.

What is claimed is:

1. A telecommunications network comprising:
   a number of interconnected switching units at least some of which provide switching for ISDN connections,
   some of said switches being connected to terminals adapted to provide (a) voice channel and data channel communications on a single communications line and (b) switching instructions by way of a data channel connection,
   control means of the network being responsive to seizure of a switch connection to recognise presence of such a terminal and to cause control means of the switch to effect decoding of data from a data channel associated with the terminal to collect any further control information required by the network for instantaneous control of the connection;
   wherein the control means of the network causes control means of the switch to effect transfer of data channel signalling from a connected ISDN termination through switch means to a prompt and collect peripheral adapted to extract control information from transmitted data; and
   the prompt and collect peripheral is arranged to transmit data through the switch means for transmission as a data message to a connected ISDN termination during a data phase of one and the same call connection including both the data phase and a voice phase, the data phase preceding the voice phase.

2. A telecommunications network as in claim 1 wherein the data transmitted is encoded text data for display on a terminal.

3. A telecommunications network as in claim 1 wherein the data transmitted is control data arranged to cause automated transmission of data defining required control information.

4. A telecommunications network as in claim 1 wherein the prompt and collect peripheral is responsive to control means of the switch to collect data, the control means of the switch effecting transmission of collected data to the control means of the network.

5. A telecommunications network as in claim 1 wherein the control means of the switch causes received data to be transmitted to the prompt and collect peripheral, the peripheral effecting transmission of collected data to the control means of the network.

6. A method of providing prompt and collect services in a digital telecommunications network in which a received-bit stream is received on a single communications line, said bit stream comprising a plurality of bearer channels and a data channel, the method comprising:
   determining from the data channel a network destination for each bearer channel initiated call;
   determining from network data relating either to the call source or the network destination whether further data is required from the call source, and, if so, causing a data message to be returned to the call source in the data channel to provide prompt information to a user; and
   awaiting user information returned in the data channel prior to completing connection of the bearer channel call to the network destination during a data phase of one and the same call connection including the data phase and a voice phase.

* * * * *